United States Patent [19]

Murata et al.

[11] 4,333,955

[45] Jun. 8, 1982

[54] PROCESSED DRIED BEANS AS INSTANT FOOD AND THEIR MANUFACTURING METHOD

[75] Inventors: Susumu Murata; Noriyuki Shimizu, both of Osaka; Sadao Kokeguchi, Ibaragi, all of Japan

[73] Assignee: Kanebo Foods, Ltd., Tokyo, Japan

[21] Appl. No.: 166,692

[22] Filed: Jul. 2, 1980

[30] Foreign Application Priority Data

Jul. 5, 1979 [JP] Japan .................... 54-85608

[51] Int. Cl.³ ............................................. A23L 1/20
[52] U.S. Cl. .................................... 426/44; 426/46; 426/50; 426/52; 426/103; 426/629
[58] Field of Search .................... 426/44, 46, 50, 52, 426/629, 634, 461, 103

[56] References Cited

U.S. PATENT DOCUMENTS

| | | | |
|---|---|---|---|
| 2,278,468 | 4/1942 | Musher | 426/46 |
| 3,510,313 | 5/1970 | Steinkraus et al. | 426/634 |
| 3,640,723 | 2/1972 | Uhlig et al. | 426/46 |
| 3,867,553 | 2/1975 | Hitze et al. | 426/46 X |
| 3,876,807 | 4/1975 | Wagner et al. | 426/46 |
| 4,119,733 | 10/1978 | Hsieh et al. | 426/50 X |
| 4,214,007 | 7/1980 | Hase et al. | 426/44 |

FOREIGN PATENT DOCUMENTS

| | | | |
|---|---|---|---|
| 2104260 | 8/1972 | Fed. Rep. of Germany | 426/44 |
| 45-23574 | 8/1970 | Japan . | |
| 45-29423 | 9/1970 | Japan . | |
| 45-29424 | 9/1970 | Japan . | |
| 45-32220 | 10/1970 | Japan . | |
| 46-40748 | 12/1971 | Japan . | |
| 50-13350 | 5/1975 | Japan . | |

*Primary Examiner*—Robert A. Yoncoskie
*Attorney, Agent, or Firm*—Cushman, Darby & Cushman

[57] ABSTRACT

A method for producing instantly cookable dried beans which restore their boiled edible condition quickly after being immersed in a hot water. This method comprises a preliminary boiling step to boil raw beans in water, a preliminary immersion step to immerse those boiled beans in water, an enzymatic treatment step to treat the resulting beans in an aqueous solution containing either cellulase or a mixture of cellulase and pectinase, a secondary boiling step to boil these processed beans in an acidic solution, and a drying step to dry the resulting beans in a super-heated steam. The beans before the drying step may be coated with sucrose or lactose. The product dry beans have good appearance with practically no cracks and fractures, and retain their flavor as beans, and can be preserved for an extended period of time, in addition to the feature that the product dried beans are quickly rendered to soft edible state by immersing them in hot water.

25 Claims, 5 Drawing Figures

PROCESSED DRIED BEANS AS INSTANT FOOD AND THEIR MANUFACTURING METHOD

BACKGROUND OF THE INVENTION (a) Field of the Invention

The present invention relates to a process for manufacturing dried pulses which are almost instantaneously restored to the soft edible condition of boiled raw pulses. More particularly, the invention pertains to a process as described above for the production of dried pulses which can be restored in a very short period of time to their boiled soft edible condition simply by pouring hot water onto the processed dried pulses.

The word "pulses" herein used will hereinafter be substituted by the word "beans" which will signify collectively various kinds of pulses, throughout the specification and the claims.

The beans which are suitable for use in the present invention are those beans which are rich in starch and poor in both protein and fat content.

(b) Description of the Prior Art

The methods for producing processed dried beans which quickly restore the soft edible condition of boiled raw beans include the following known methods: (1) a method comprising first softening raw beans by boiling the beans together with a softening promoter such as polyphosphate to soften also their seed coat, and thereafter immersing the resulting softened beans in a solution such as a saccharine solution, followed by drying the resulting solution-treated beans in heated air; and (2) a method of producing processed dried beans by simultaneously freezing and drying the boiled softened raw beans in vacuo.

However, the processed dried beans produced in accordance with the above-mentioned known method (1) are not easily and quickly restored to their soft boiled edible condition by merely pouring hot water thereonto, because these beans have poor permeability of hot water into the interior of the beans. Whereas, those processed dried beans produced in accordance with the method (2) mentioned above are fairly good in their restorability to boiled edible condition, this restorability still is not satisfactory. Besides, they lack their original flavor and natural good feel to the tongue since the textures and tissues of the cells of the beans themselves have been indiscriminately destroyed during the freezing-drying treatment.

As stated, the restorability of those processed dried beans obtained according to the known processes (1) and (2) mentioned above is invariably not satisfactory. The present inventors have earlier proposed, in U.S. Pat. No. 4,214,007, a method for producing processed dried beans which almost instantaneously restores the condition of boiled soft raw beans simply by pouring hot water onto the processed dried beans, by first boiling raw beans in hot water, and then subjecting the boiled beans to an enzymatic treatment by contacting said boiled beans with an aqueous solution containing an enzyme selected from a group consisting of cellulase and a mixture of cellulase and pectinase at a pH of acidic to neutral, and thereafter drying said beans. By this previously proposed method, the insufficient restorability to the soft edible condition of dried beans by the already known methods has been improved to some extent. According to this previously proposed method, however, there is the disadvantage that the pectic intercellular substances which have been somewhat destroyed during the enzymatic treatment are destroyed further in a secondary boiling which is customarily carried out. Thus, there is the tendency for the occurrence of deformation of the original configuration of the beans. In addition, this prior method carries out drying by means of heated air. Accordingly, only the surface portion of beans dries first, and gradually the drying progresses into the interior portion of the beans. As such, during the initial period of the drying step, there occurs a great difference in the degree of drying between the surface portion and the core portion of the beans. As a result, the surface of the beans tends to curve or bulge outwardly, causing cracks and fractures to develop, thus spoiling the external appearance of the product dried beans. Thus, the dried beans according to said previously proposed method are good in quick restorability to boiled edible condition when poured with hot water, but their external appearance still has much to be improved.

SUMMARY OF THE INVENTION

The present invention is intended to improve the method disclosed in said U.S. Pat. No. 4,214,007, and proposes a method for producing processed dried beans as an instant food by first boiling beans, and then subjecting the resulting boiled beans to an enzymatic treatment using an aqueous solution of either cellulase alone or a mixture of cellulase and pectinase, and thereafter boiling them under an acidic condition, and finally drying them with super-heated steam. According to the present invention, destruction of pectic intercellular substances can be suppressed appropriately due to the secondary boiling done under acidic conditions after the enzymatic treatment, so that deformation of beans during the secondary boiling step can be avoided. Furthermore, this along with the quick drying by the use of super-heated steam concurrently contributes to the production of dried beans having good external appearance without the development of cracks, fractures and deformed configuration. When the product dried beans are eaten after pouring hot water thereonto, the edible beans provide a satisfactory sense to the tongue and the natural good flavor peculiar to beans.

DETAILED DESCRIPTION OF THE PREFERRED EMBODIMENTS

Figure 1:
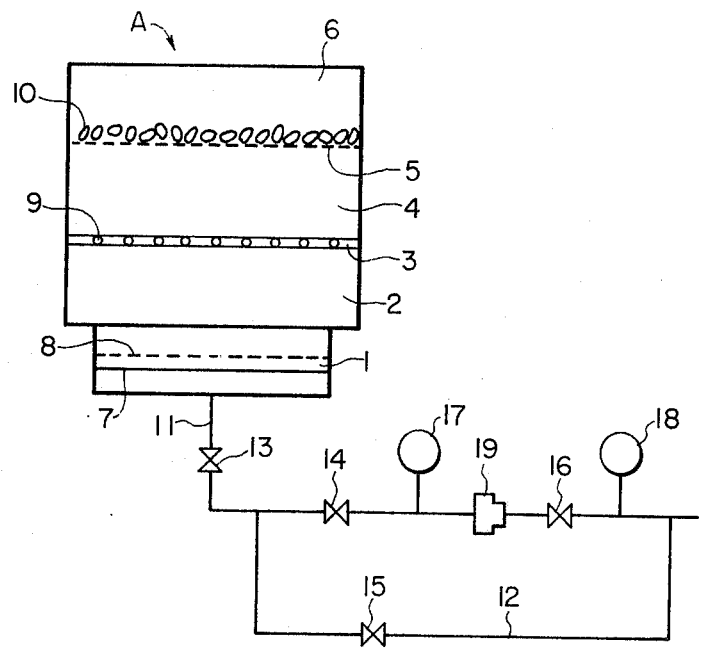
FIG. 1 is a diagrammatic sectional view of a drying means utilizing super-heated steam for use in the present invention.

The processed dried beans of the present invention may be produced from various kinds of beans which are rich in starch and poor in both protein and fat contents, and which are suitable for subsequent preparation of a paste of boiled beans simply by pouring hot water onto the processed dried beans. Pastes of boiled beans can be prepared easily by merely pulverizing or grinding or mashing or kneading the beans in their restored boiled condition. The beans which are suitable for use in the present invention include Adzuki beans (*Phaseolus angularis*), Peyin beans (*Phaseolus calcaratus*), Kidney beans (*Phaseolus vulgaris*), Scarlet runners (*Phaseolus coccineus*), Lima beans (*Phaseolus lumates*), Peas (*Pisum sativum*), Broad beans (*Vicia faba*), Cuba beans (*Vigna sinensis*), and Catiangs (*Vigna catiang*). Those beans such as peanuts and soy beans which are rich in fat and protein are not suitable for use in the present invention. Powdered beans which are obtained after the processed dried beans are first brought into contact with hot water to restore the initial boiled soft condition and then are mashed may be used for the preparation of "Zenzai" or "Shiruko", the former being a sweetened soup of mashed boiled beans and the latter being a sweetened soup containing a number of soft but independent pieces of boiled beans.

According to the present invention, beans are invariably subjected, at least once, and preferably twice, to boiling treatment in hot water prior to being given an enzymatic treatment (such boiling step will hereunder be referred to as the preliminary boiling treatment or step), in order to have an enzyme act effectively on the beans.

This preliminary boiling treatment of raw beans is carried out under atmospheric pressure at the temperature of the boiling point of water or at a temperature in the vicinity of the boiling point of water for a total period of 3 to 30 minutes. Through this boiling step of raw beans, organic and inorganic components such as tannin, saponin and gummy substances and other substances which are contained in the seed coat and the seed lobe (cotyledon) of each bean and which are soluble in hot water and which would hamper the retention of good taste and flavor of raw beans are extracted and removed. Along therewith, during the preliminary boiling treatment of raw beans, the soft cells, i.e. parenchymatous cells, of these beans are caused to progressively become a mass of swollen cells, i.e. the cells are destroyed and the starch component of the cells is gelatinized, so that, in other words, the water-content of the boiled material, as well as the area of the contact of cells with the enzyme in the subsequent enzymatic treatment, increase during this preliminary boiling treatment.

Accordingly, as a result of this preliminary boiling treatment, the water content of each bean will increase and the beans will become swollen, to thereby enhance the action and effect of the enzyme during the subsequent enzymatic treatment of the boiled beans, and to result in substantial preservation, by the product beans, of the taste and flavor of the original boiled beans. In case, however, the preliminary boiling treatment of raw beans is omitted before subjecting the beans to an enzymatic treatment, it has been noted that the action of the enzyme during the subsequent enzymatic treatment is hampered, and the taste and flavor as well as the ability of the product dried beans to restore the initial boiled soft condition becomes markedly lowered. Thus, the omission of the preliminary boiling treatment of raw beans prior to enzymatic treatment is not desirable.

The operation of boiling raw beans to cause extraction and removal of the aforesaid substances which are soluble in hot water is usually called the operation of extracting the astringency of the beans. This boiling treatment is carried out usually 1 to 2 times, and occasionally as many as 3 times. It is preferable to add a softening promoter such as sodium- or potassium- polyphosphate during this boiling treatment, since the addition of such substance will enhance the action and effect of the enzyme. By repeating the boiling treatment twice, the extraction as well as the removal of such substances which are soluble in hot water, and the aforesaid gelatinization of starch components can, both, be carried out almost perfectly. It should be understood also that, after carrying out an initial astringency-extracting operation and after discarding the extractant, i.e. the boiling water used, or after the second preliminary boiling treatment, the boiled raw beans may be washed with tap water or in a washing basin containing fresh water. Also, the boiled raw beans may be immersed in fresh water to concurrently cool and wash the boiled raw beans, prior to being subjected to an enzymatic treatment.

Prior to said preliminary boiling step, raw beans desirably are immersed in water, which is generally called a preliminary water immersion step, and contributes to causing the swelling of the tissues of beans as well as to facilitating the extraction of those substances soluble in hot water in the subsequent preliminary boiling step, and further to enhancing the effect of the subsequent enzymatic treatment. The temperature of water in this preliminary immersing step is 5° to 60° C., usually room temperature, and the time thereof is 2 to 18 hours.

Cellulase which is used in the present invention is an enzyme which exhibits an enzymatic reaction on cellulosic substances such as cellulose and hemi-cellulose. For example, the cellulase which is produced by Trichoderma viride bacilli (e.g. Cellulase Onozuka which is the commercial name of the product of Kinki Yakult Co., Ltd. of Japan), the cellulase which is produced by Irpex lacteus bacilli (e.g. Driserase which is the commercial name of the product of Kyowa Hakko Co., Ltd. of Japan), and the cellulase which is produced by Trichoderma koningi bacilli (e.g. Meicelase which is the commercial name of the product of Meiji Seika Co., Ltd. of Japan) are especially preferable. On the other hand, the cellulase which is produced by *Aspergillus niger bacilli, which is an analogous cellulase (e.g. Takamine Cellulase which is the commercial name of the product of Chemische Fabrik Naarden of Holland, or Cellulosin AP and Cellulosin AC of Ueda Kagaku Co., Ltd. of Japan), or the cellulase which is produced by Fusarium Moniliforme bacilli* (e.g. Toyo-Cellulase of Toyo Jozo Co., Ltd. of Japan), or Celluzyme and Cellulase-Nagase of Nagase Sangyo Co., Ltd. of Japan, and FA-53-1 of Sankyo Co., Ltd. of Japan, are found to be somewhat inferior to the first-mentioned cellulases when such cellulase is used independently; however, these latter cellulases can be employed jointly with the first-mentioned cellulases or with the pectinase which will be described later, with an agreeable result.

Pectinase which is used in the present invention is an enzyme which exhibits an enzymatic reaction on pectin-containing substances. For example, the pectinase which is produced by *Rhizopus arrhizus bacilli* (e.g.

Macerozyme which is the commercial name of the product of Kinki Yakult Co., Ltd. of Japan), and the pectinase which is produced by *Coniothrium diplodiella bacilli* (e.g. Sclase S which is the commercial name of the product of Sankyo Co., Ltd. of Japan) are especially preferred.

In the present invention, there is used, as an enzymatic treatment solution, an aqueous solution containing cellulase or a combination of cellulase and pectinase as mentioned above. In case cellulase alone is used, the amount employed in the present invention ranges from 0.1 to 5.0% by weight, preferably from 0.4 to 1.0% by weight, based on the weight of the beans employed. In case a combination of cellulase and pectinase is intended, the respective amounts of these two enzymes are: 0.1 to 3.0% by weight, preferably 0.3 to 1.0% by weight, of cellulase, and 0.1 to 4.0% by weight, preferably 0.3 to 1.0% by weight, of pectinase. The solution of such enzyme or enzymes in combination which is to be applied to the already boiled raw beans, is prepared by dissolving a required amount of enzyme in a required amount of water. In the event that cellulase or a combination of cellulase and pectinase is added to boiled beans in an amount less than the above-indicated ranges, the processed dried beans will tend to possess a decreased ability to restore to their initial boiled soft condition and also a lowered degree of taste, flavor and so forth when the product dried beans are brought into contact with hot water during cooking, as compared with the processed dried beans treated with cellulase or a combination of cellulase and pectinase of an amount falling within the above-mentioned ranges. On the other hand, the use of an amount of such enzyme or enzymes in excess of the above-mentioned ranges shows no substantial change in the effect of the enzymes, but the use of excessive amounts of enzyme or enzymes is not desirable from the viewpoint of cost.

When the effect obtained by using cellulase as a single enzyme in accordance with the present invention is compared with the effect obtained by the use of a combination of the abovesaid two enzymes, it has been noted that a combined use of cellulase and pectinase is most preferred.

The pH of the enzyme solution which is to be used in the present invention will vary depending on the type of the enzyme employed. However, it has been noted that ordinarily an appropriate range of value of pH is from 3.0 to 7.0. The most preferred pH value is in the range of 3.0 to 5.0 in case cellulase alone is used. The most preferred range of value of pH for the combined use of cellulase and pectinase is from 3.5 to 5.0. In order to make adjustment of the pH value of the enzyme solution, it is possible to use an organic acid such as citric acid, acetic acid, tartaric acid and the like, or to use a buffering agent of such organic acid. Also, in order to promote the enzyme reaction, any activating agent may be added. The temperature of the enzyme solution is determined depending on the optimum temperature for the optimum exhibition of the activity of the enzyme employed. However, it has been noted that ordinarily a temperature in the range of from 30° to 50° C., preferably 40° to 45° C., is suitable. The amount of the enzyme solution ordinarily is such that it is enough to immerse the beans completely in the solution. Usually, the amount of enzyme solution is 2 to 5 times the weight of the beans. It should be noted that this amount of solution applies in the same way to other solutions employed in the present invention.

The treatment of beans with an enzyme or enzymes, i.e. the enzymatic reaction, is carried out so as to establish good contact between the beans and the enzyme solution. Such treatment may be performed in practice by either leaving the beans immersed in the enzyme solution to stand as they are, or by stirring both the beans and the enzyme solution in which the beans are immersed. The length of time of such enzymatic treatment by the use of an enzyme solution is in the range of from 30 to 180 minutes, preferably 60 to 120 minutes, in case both the beans and enzyme solution are stirred; the duration of enzymatic treatment ranges from 0.5 to 6 hours, preferably 3 to 4 hours, when beans are left to stand in the enzyme solution. It has been noted that, in case the length of time of enzymatic treatment of beans is too short, no satisfactory effect of the enzyme can be obtained. Whereas, in case the enzymatic reaction continues too long, there could arise an adverse effect such that the taste and flavor of the product dried beans becomes degraded due to contamination by microorganisms, or such that the beans per se become damaged during stirring.

In case beans are treated in an enzyme solution under the above-mentioned conditions, the enzyme will act upon the pectic intercellular substances or cellulosic substances existing in the cell walls of beans, uniformly and effectively destroying the cell tissues existing therearound, whereby improving the permeation of hot water into the core of each bean and also improving the ability of the beans to restore the initial boiled soft condition of raw beans, during the cooking or preparation of food by the use of the product dried beans. This is a feature of the present invention.

In accordance with the present invention, the beans which have been given the aforesaid enzymatic treatment are then subjected to another boiling treatment (hereinafter to be referred to as the secondary boiling treatment or step) under an acidic condition of a pH value of 1.5 to 5.5, preferably a pH of 3.0 to 4.5. This secondary boiling consists of boiling the beans under said acidic condition at a temperature of 100° to 130° C. for 20 to 80 minutes at atmospheric pressure, or for 10 to 40 minutes under a pressure. In case the pH value is less than 1.5, the product beans will have an increased sour taste, while loosing good flavor. Whereas, in case the pH value exceeds 5.5, there will arise undesirable deformation of bean configuration during boiling, as will be described later. The adjustment of pH value of the liquid for the secondary boiling step may be carried out by the use of such organic acids or such buffering agents as mentioned above in the enzymatic treatment.

By giving the beans the abovesaid secondary boiling after the enzymatic treatment, it is possible to deactivate a very small amount of enzyme still remaining in the beans, and at the same time the starch component existing in the cells of the beans is caused to swell and become gelatinized, so that the degree of the starch of beans to be converted to $\alpha$-type starch as well as the ability of these beans to restore the initial boiled soft condition can be improved. It should be understood, however, that if the secondary boiling treatment is conducted in a neutral or alkaline condition, the pectic intercellular substances which have been destroyed already to a certain extent during the aforesaid enzymatic treatment will be destroyed further until the bean configuration is destroyed. As a result, there will easily occur deformation of the bean configuration during the secondary boiling step, giving rise to the development of cracks and fractures in the subsequent drying step. Thus, the product dried beans will have unacceptable external appearances. However, by carrying out the secondary boiling under an acidic condition, such excessive destruction of pectic intercellular substances can be suppressed, and there can be achieved an appropriate destruction of those pectic intercellular substances existing in the cell walls of beans, and also said deformation of the bean configuration can be prevented. Accordingly, along with the quick drying effect in the subsequent drying step using super-heated steam, there are successfully obtained product dried beans having excellent external appearances, being free of cracks, fractures and deformation.

In an aspect of the present invention, the secondary boiling step is conducted by boiling the beans which have passed through the enzymatic treatment in a solution containing at least one of the substances selected from the group consisting of sucrose fatty acid ester, sorbitan fatty acid ester and glycerin fatty acid ester (hereinafter to be referred to as fatty acid esters). By doing so, the water-soluble starch exuding from the starch particles enclosed in a protein-rich film when this film is destroyed due to excessive boiling and said fatty acid ester or esters contained in the boiling liquid jointly form a complex, and thus the gelatinization of the water-soluble starch is suppressed. That is, in case the boiling liquid does not contain said fatty acid ester or esters, the water-soluble starch coming out from a destroyed bean paste cell (the words "bean paste cell" mean each of the starch particles, each being surrounded by a protein-rich film) adheres to the surfaces of other bean paste cells. In case the beans which have been rendered to such state are dried, the respective bean paste cells will become combined firmly and closely to each other, leading to a degradation of permeability of hot water, thus constituting a cause for the development of granular sense when eaten. In contrast thereto, the secondary boiling which is carried out in a liquid containing at least one such fatty acid ester leads to a dry beans product which, when restored to edible state by immersion in hot water, exhibit an improved permeability to hot water, in addition to the restoration of edible state which is accomplished in a shortened period of time, and the beans thus rendered to edible state present substantially no portions having a granular mouth feel or sense when eaten. In order to prevent the development of a granular sense when eaten, it is desirable to use sucrose fatty acid ester and/or sorbitan fatty acid ester. On the other hand, by the use of a glycerin fatty acid ester, this ester acts as a sort of coating, and prevents an excessively rapid evaporation of water content of beans during the drying step. Thus, there are obtained good-proportioned product dried beans having substantially no cracks and fractures, thereby enhancing the appearance of the product dried beans. Furthermore, by a combined use of glycerin fatty acid ester and the aforesaid fatty acid ester or esters, their respective effects are imparted to the beans, so that there are obtained product dried beans which are not only good in their appearance as a product, but also good when cooked to the edible state.

In a preferred embodiment of the present invention, the beans which have been given the secondary boiling treatment may prior to the drying step be coated with a solution of either sucrose or lactose either by the application of such coating to those beans or by immersing the treated beans in such solution before being dried to form a protective layer or film of sucrose or lactose on the surface of each bean. Such formation of protective layer or film is not only effective in the prevention of development of cracks and fractures of beans during the drying step, but also serves to add some sweetness to the product dried beans and also to enhance the taste and flavor in the product dried beans.

In the past, drying of the treated beans has been performed either by drying in heated air or by freezing and drying boiled softened raw beans in vacuo. The method of drying boiled beans in heated air not only requires a lengthy period of time, but also causes drying of only the surface portion of beans in the initial period of drying, and the drying extends gradually into the interior portion of the beans. Thus, it happens that, while the surface portion of beans is dried, the interior portion thereof is still left in a non-dried condition. As a result, the surface of beans becomes curved outwardly, causing cracks and fractures of beans and thus losing the original appearance as beans. Furthermore, this drying method gives rise to the tendency that the texture and tissue of beans shrink and agglutinate during the drying step. As a result, there is the drawback that the product dried beans have inferior restorability to the boiled edible state. On the other hand, the product dried beans which have been subjected to freezing and drying in vacuo are such that the tissue and texture of the beans are indiscriminately destroyed. Therefore, this latter method has the drawback that the flavor of the beans and the mouth feel or sense when such beans are eaten are markedly damaged.

As a result of strenuous research and experiment to eliminate the abovesaid drawbacks of the prior art, the present inventors have discovered that a satisfactory result is obtained by the use of super-heated steam in the drying step.

FIG. 1 is a diagrammatic sectional view of the drying device to show the arrangement of this device which is employed in the present invention. This drying device comprises a sealed vessel A provided at its bottom with a steam current rectifying section 1; a first cavity section 2; a steam-heating section 3; a second cavity section 4; a shelf section 5; and a third cavity 6, in this order from bottom to top in the enclosed vessel A. Boiled beans are placed on the shelf for drying.

Description will next be made of the method of drying boiled beans by the use of the above-mentioned drying device.

Beans which have gone through the secondary boiling treatment are sufficiently filtered out of their moisture up to a water content of 65–70% by weight, and they are placed substantially uniformly on the shelf 5. On the other hand, the pressure of the steam fed through a main steam-feeding pipe not shown is adjusted to a level of 0.1–1.25 kg/cm$^2$G by a pressure-reducing valve 19. This pressure-reduced steam is fed into the steam current rectifying section 1 for rectifying the currents of steam. Therefrom, the steam current which has been made sufficiently uniform by the first cavity section 2 is blown uniformly onto the steam-heating section 3 to produce a super-heated steam having a super-heat degree of 60°–150° C. and a drying ability of 0.4–0.8 Drying ability denotes the amount of steam supplied, per unit period of time, for drying the beans relative to the total weight of beans prior to drying by super-heated steam. This super-heated steam is passed through the second cavity section 4, and is blown uniformly onto the uniformly arranged beans 10 on the shelf for a period of 10 to 20 minutes to dry them until their water content is reduced to 8–12% by weight.

In case the degree of super-heat of the super-heated steam is less than 60° C., the time required for drying will be prolonged, easily bringing about shrinking and agglutination of the tissue and texture of beans, and the beans become stiff, thus lowering the sense when cooked beans are eaten. Conversely, when the degree of super-heat exceeds 150° C., there would develop burns of beans, causing the degradation of flavor and also difference in the degree of dryness in various portions of each bean. This leads to the development of cracks and fractures in the beans, spoiling the external appearance of product dried beans. Also, in case the drying ability of super-heated steam is less than 0.4, the beans will contain an excess amount of moisture, so that the beans which are dryed by such super-heated steam are observed to have a poor external appearance. Not only that, a lengthy period of time will be required for the drying. Accordingly, the tissue and texture of beans easily develop shrinking and agglutination, causing the beans to become stiff and hard, greatly degrading the sense when the cooked beans are eaten. Conversely, when the drying ability exceeds 0.8, there develop burns on the surface of beans, which lower the flavor of beans, and also there develop differences in the degree of dryness between the surface portion and the interior portion of the beans, causing cracks and fractures so that the beans have a poor external appearance.

In case the water content of beans after drying exceeds 15% by weight, there tends to grow mold during storage.

Product dried beans which have been dried by the use of heated air have a shrinked seed coat which leads to cracks and fractures of the beans, spoiling their external appearance. Also, those dried beans which have been frozen and dried have indiscriminately destroyed tissue and texture of beans, which greatly degrade their flavor and sense when eaten.

According to the drying method employed in the present invention, the boiled beans can be dried in a short period of time, and various portions of the individual beans can have a substantially uniform degree of dryness. Thus, there develops hardly any crack and fracture of the beans, and there hardly takes place any shrinking and agglutination of the texture and tissue of the beans. Moreover, the tissue and texture of the beans are rendered porous, and thus the restorability to boiled edible condition when poured with hot water can be improved. Also, by the secondary boiling step which is carried out in an acidic condition, the pectic intercellular substances are appropriately kept from being destroyed and from exuding outwardly. This contributes effectively to the preservation of the original configuration of the beans.

Next, description will be made of the difference in the tissue and texture of the instantly cookable dried beans obtained through the drying by heated air and those obtained through the drying by super-heated steam, by referring to the drawings provided herewith on an enlarged scale.

Figure 2:
FIG. 2 is a diagrammatic sectional view, on an enlarged scale, of an instantly cookable dried kidney bean obtained by drying with heated air instead of using super-heated steam which is employed in the present invention.
Figure 3:
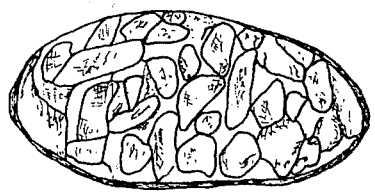
FIG. 3 is a diagrammatic sectional view, on an enlarged scale, of an instantly cookable dried kidney bean obtained by drying with super-heated steam according to the present invention.

FIG. 2 is an enlarged sectional view of an instantly cookable dried kidney bean which is produced through the drying step using heated air. FIG. 3 is an enlarged sectional view of an instantly cookable dried kidney bean which is obtained through the drying step using super-heated steam according to the present invention. As will be clear from FIG. 2, the dried bean obtained through the drying step using heated air has many cracks and fractures which clearly represent the shrinking and agglutination of tissue occurring during the drying step. Thus, this dried kidney bean has poor restorability to the boiled edible condition when immersed in hot water. When this dried bean is immersed in hot water of 95° C., it takes 8 to 15 minutes to restore the soft edible condition. On the other hand, as will be clear from FIG. 3, the dried bean obtained through the drying step using super-heated steam according to the present invention apparently has no formation of cracks and agglutination, and the texture of the bean is rendered to porous condition such that individual pores are distributed widely in the texture. Accordingly, this dry bean is extremely good in its restorability to the boiled edible state when immersed in hot water. This dried bean obtained according to the present invention restores this state in 5 minutes when immersed in hot water of 95° C.

Figure 4:
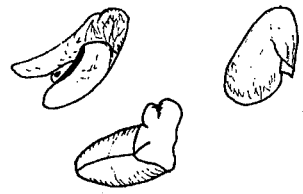
FIG. 4 is a diagrammatic external view of an instantly cookable kidney bean obtained by drying with heated air instead of using super-heated steam employed in the present invention.
Figure 5:
FIG. 5 is a diagrammatic external view of an instantly cookable kidney bean obtained by drying with super-heated steam according to the present invention.

FIG. 4 shows an external appearance of an instantly cookable dried kidney bean which is obtained through the drying step using heated air. FIG. 5 shows an external appearance of a dried kidney bean which is obtained through the drying step using super-heated steam according to the present invention. As is clearly noted from FIG. 4, the dried bean obtained from the drying step using heated air is noted to have a very unacceptable external appearance such that it has cracks in the seed coat exposing the lobe portion, and that the cracks not only are present in the seed coat portion, but also these cracks extend as deeply as to the lobe portion, presenting the state that the bean is widely fractured. Contrariwise, as is clear from FIG. 5, the dried bean obtained through the drying step using super-heated steam according to the present invention shows only some very slight cracks in the seed coat portion, but these cracks do not reach the lobe portion, and they do not expose the lobe between the cracks, and the bean shows no fractures. Thus, it will be understood that the product dried bean according to the present invention has a superior external appearance.

Also, the dried beans obtained through the drying step of the present invention using super-heated steam may be subjected to a further drying using heated air at about 100° C. for 5 to 10 minutes to reduce the water content of these beans to 8–10% by weight. By doing so, a moisture content of beans can be stably preserved for an extended period of time.

The instantly cookable dried beans obtained according to the process of the present invention have appropriately and effectively destroyed cell tissues which are thus rendered to the porous state as stated above, and have highly α-converted starch components, as explained above. Thus, these dried beans of the present invention have good appearance, free of cracks and fractures, and are superior in their restorability to the boiled edible state, and have the flavor peculiar to beans, and give a good sensation when eaten. As such, the product dried beans obtained according to the method of the present invention are quite useful when applied to, for example, the preparation of aforesaid "Zensai", or when used as instantly boiled beans, or when served as instantly prepared paste of boiled beans.

Some examples of the present invention will be mentioned hereunder. The "appearance", the "restoring speed" and the "taste evaluation" which are shown in these examples are defined as follows.

(1) Appearance 300 sample pieces of the processed dried beans are grossly (macroscopically) examined for the scarcity of cracks and fractures that have developed. The evaluation is made based on the following points, and the results are shown by the average value of the scores.

| Evaluation Score | Remarks |
| --- | --- |
| 3 | Beans have practically no crack and fracture and preserve their original bean configurations. |
| 2 | Beans have cracks and fractures to a light degree. |
| 1 | Beans have cracks and fractures to an intensive degree. |
| 0 | Beans are almost cracked and fractured. |

(2) Restoring time when immersed in hot water 10 grams of processed dried bean samples are immersed in 100 cc of hot water at 90° to 95° C. The length of time in minutes required to restore the dried beans is measured.

(3) Taste Evaluation 10 grams of processed dried bean samples are immersed in 100 cc of hot water at 90° to 95° C. for 2 minutes. Thereafter, the evaluation of these beans is done by a panel of 10 persons with respect to the below-mentioned references, and the total of scores given by these persons is shown (full score is 20).

| Evaluation of sense of hardness when eaten Score | References |
| --- | --- |
| 2 | Beans exhibit a sense when eaten, similar to that obtained from boiled raw beans, without any sense of hardness. |
| 1 | Beans have hard portions and intensively muddy portions. |
| 0 | Beans give strong sense of hardness. |
| Evaluation of granular mouth feel or sense when eaten Score | References |
| 2 | Beans exhibit a sense when eaten, similar to that obtained from boiled raw beans, without any granular sense when eaten. |
| 1 | Beans give slight granular sense when eaten. |
| 0 | Beans give strong granular sense when eaten. |

EXAMPLE 1

3 kg of raw Adzuki beans are kept immersed for 16 hours in 6 liters of water at 20° C. (preliminary immersion). Thereafter, these Adzuki beans are boiled for 15 minutes in an oven containing 8 liters of boiling water under atmospheric pressure. Then, the liquid after this boiling treatment is removed from the boiled beans, and the beans are cooled in 6 liters of fresh water. Then, the resulting beans are subjected to enzymatic reaction by immersing them for 2.5 hours in 8 liters of an aqueous solution of enzyme having a pH adjusted to 3.5 by citric acid and containing 18 g of Meicelase (0.6% relative to the weight of the beans) and also containing 18 g of Macerozyme (0.6% relative to the weight of the beans) and being held at 40° C. The treated beans are then transferred into a boiling oven containing 8 liters of water, and are boiled therein whose pH is adjusted to 3.5 by the addition of citric acid and at 118° C. for 30 minutes under pressure (secondary boiling treatment). Thereafter, the resulting beans are dried for 12 minutes in super-heated steam having a drying ability of 0.65 and a super-heat degree of 120° C. by the use of a super-heated steam dryer.

The dried Adzuki beans thus obtained have a water content of 8%, and an appearance evaluation score of 2.8 points, and a restoring time of 2 minutes, and a taste evaluation score of 20 points.

EXAMPLE 2

The procedure similar to that of Example 1 is followed, excepting the use of 8 liters of enzymatic solution of 40° C. containing 18 g of Meicelase (0.6% relative to the weight of raw beans) and having a pH of 3.5.

The dried Adzuki beans thus obtained have a water content of 9%, an appearance evaluation score of 2.6 points, a restoring time of 1.5 minutes, and a taste evaluation score of 20 points.

Control Example 1

The procedure of Example 1 is performed, excepting that the secondary boiling solution has a pH of 1. The dried Adzuki beans thus obtained have a water content of 9%, an appearance evaluation score of 2.7 points, a restoring time of 2 minutes, and a taste evaluation score of 18 points. However, these beans give some residual sour taste, and the flavor is poor.

EXAMPLE 3

The procedure of Example 1 is followed, excepting that the secondary boiling solution has a pH of 2. The dried Adzuki beans thus obtained have a water content of 8.5%, an appearance evaluation score of 2.8 points, a restoring time of 2 minutes, and a taste evaluation score of 20 points.

EXAMPLE 4

The procedure of Example 1 is followed, excepting that the secondary boiling solution is held at a pH of 3. The dried Adzuki beans thus obtained have a water content of 9%, an appearance evaluation score of 2.9 points, a restoring time of 2 minutes, and a taste evaluation score of 20 points.

EXAMPLE 5

The procedure of Example 1 is followed, excepting that the pH of the secondary boiling solution is adjusted to B 4. The dried Adzuki beans thus obtained have a water content of 7%, an appearance evaluation score of 2.8 points, a restoring time of 2 minutes, and a taste evaluation score of 20 points.

EXAMPLE 6

The procedure of Example 1 is performed, excepting that the secondary boiling solution is adjusted to have a pH of 5. The dried Adzuki beans thus obtained have a water content of 8%, an appearance evaluation score of 2.8 points, a restoring time of 2 minutes, and a taste evaluation score of 20 points.

Control Example 2

The procedure of Example 1 is followed, excepting that the secondary boiling solution is adjusted to a pH of 6. The resulting dried Adzuki beans have a water content of 8%, an appearance evaluation score of 2.0 points, a restoring time of 2 minutes, and a taste evaluation score of 20 points.

Control Example 3

The procedure of Example 1 is followed, excepting that the secondary boiling solution is adjusted to a pH of 7. The resulting dried Adzuki beans have a water content of 9%, an appearance evaluation score of 1.9 points, a restoring time of 1.5 minutes, and a taste evaluation score of 18 points.

The results of the test reported in Examples 3, 4, 5 and 6 and that in Control Examples 1, 2 and 3 are shown in Table 1.

TABLE 1

|  | Appearance (points) | Restoring time (min.) | Sense of hardness when eaten (points) | Water content (%) | Taste | Secondary boiling solution (pH) |
| --- | --- | --- | --- | --- | --- | --- |
| Control 1 | 2.7 | 2.0 | 18 | 9 | sour | 1 |
| Example 3 | 2.8 | 2.0 | 20 | 8.5 | good | 2 |
| Example 4 | 2.9 | 2.0 | 20 | 9 | good | 3 |
| Example 5 | 2.8 | 2.0 | 20 | 7 | good | 4 |
| Example 6 | 2.8 | 2.0 | 20 | 8 | good | 5 |
| Control 2 | 2.0 | 2.0 | 20 | 8 | good | 6 |
| Control 3 | 1.9 | 1.5 | 18 | 9 | good | 7 |

As will be clear from Table 1, in case the pH of the secondary boiling solution is less than 1.5, the product dried beans retain some sour taste so that their flavor when eaten is poor. Also, in case the pH of the solution exceeds 5.5, the external appearance of the dried beans is noted to show a sudden degradation. Thus, it has been found that the use of a secondary boiling solution having an acidic condition at a pH of 1.5–5.5 is effective.

EXAMPLE 7

The procedure of Example 1 is performed, excepting that the first boiling step is conducted by the use of an aqueous solution containing 25 g of polyphosphate. The dried Adzuki beans thus obtained have a water content of 10%, an appearance evaluation score of 2.9 points, a restoring time of 1.5 minutes and a taste evaluation score of 20 points.

EXAMPLE 8

The procedure of Example 1 is performed, with the exception that the treated Adzuki beans prior to being dried are immersed for 10 minutes in an aqueous solution of 30% by weight of sucrose at 50° C. The dried Adzuki beans thus obtained have a water content of 10%, an appearance evaluation score of 2.9 points, a restoring time of 2.5 minutes, and a taste evaluation score of 18 points.

EXAMPLE 9

The procedure of Example 1 is performed, excepting that the preliminary immersion step is not carried out, and that the preliminary boiling step is carried out twice (the beans are boiled for 15 minutes at atmospheric pressure, followed by immersion in cold water, and thereafter the same steps are repeated once again). The dried Adzuki beans have a water content of 8%, an appearance evaluation score of 2.8 points, a restoring time of 2 minutes, and a taste evaluation score of 19 points.

Control Example 4

The procedure of Example 1 is performed, with the exception of omission of the enzymatic treatment. The dried Adzuki beans thus obtained have a water content of 7%, an appearance evaluation of 2.6 points, but the dried beans do not restore to their boiled edible state at the end of immersion in hot water for 25 minutes. The taste evaluation score is 0 points.

Control Example 5

The procedure of Example 1 is followed, with the exception that the preliminary boiling step is carried out for 60 minutes under atmospheric pressure, and that the secondary boiling step is omitted. The resulting dried Adzuki beans have a water content of 8%, an appearance evaluation score of 1.6 points, a restoring time of 2 minutes, and a taste evaluation score of 20 points.

Control Example 6

The procedure of Example 1 is conducted, with the exception that the drying is performed by the use of heated air (air feed speed 2.5 m/sec, at 120° C., for 50 minutes).

The dried Adzuki beans have a water content of 9%, an appearance evaluation score of 1.8 points, a restoring time of 2 minutes, and a taste evaluation score of 18 points.

Control Example 7

The procedure of Example 1 is carried out, with the exception that the secondary boiling step is conducted using a water of city water supply (pH 6.4) without adjusting the pH, and the drying is performed by the use of heated air.

The dried Adzuki beans thus obtained have a water content of 8%, an appearance evaluation score of 1.3 points, a restoring time of 2 minutes, and a taste evaluation score of 18 points.

The results of Example 1 and that of Control Examples 4, 5, 6 and 7 are shown in Table 2.

TABLE 2

|  | Appearance (points) | Restoring time (min.) | Sense of hardness when eaten (points) | Water content (%) | Remarks |
| --- | --- | --- | --- | --- | --- |
| Example 1 | 2.8 | 2.0 | 20 | 8 | present invention |
| Control 4 | 2.6 | insufficient restoration at end of 25 min. | 0 | 7 | no enzymatic treatment |
| Control 5 | 1.6 | 2.0 | 20 | 8 | preliminary boiling for 60 min. with no secondary boiling |
| Control 6 | 1.8 | 2.0 | 18 | 9 | dried with heated air |

TABLE 2-continued

| | Appearance (points) | Restoring time (min.) | Sense of hardness when eaten (points) | Water content (%) | Remarks |
|---|---|---|---|---|---|
| Control 7 | 1.3 | 2.0 | 18 | 8 | pH of secondary boiling solution not adjusted. dried with heated air. |

From Table 2, the following have been found.

(1) As is clear from the results of Example 1 and of Control Example 4, the enzymatic treatment is very effective in obtaining instantly cookable dried beans having superior restorability to the boiled edible condition.

(2) As is clear from the results of Example 1 and of Control Example 5, the secondary boiling treatment under an acidic condition is very effective.

(3) As is clear from the results of Example 1 and of Control Example 6, the drying step using super-heated steam is very effective in obtaining instantly cookable dried beans having good external appearance with practically no cracks and fractures, as compared with those dried beans obtained through the drying step using heated air.

(4) As is clear from the results of Example 1 and of Control Example 7, the combination of the secondary boiling step done under an acidic condition and the step using super-heated steam is very effective in obtaining instantly cookable dried beans having a good external appearance with practically no cracks and fractures.

Control Example 8

The procedure of Example 1 is followed, excepting that the super-heat degree temperature of the super-heated steam for the drying step is 50° C., and that the drying in this condition is conducted for 20 minutes. The dried Adzuki beans thus obtained have a water content of 12%, an appearance evaluation score of 2 points, a restoring time of 7 minutes, and a taste evaluation score of 6 points.

EXAMPLE 10

The procedure of Example 1 is followed, excepting that the super heat degree of the super-heated steam for the drying step is 60° C., and that the drying in this condition is conducted for 15 minutes. The dried Adzuki beans thus obtained have a water content of 8%, an appearance evaluation score of 2.8 points, a restoring time of 2 minutes, and a taste evaluation score of 20 points.

EXAMPLE 11

The procedure of Example 1 is followed, with the exception that the super heat degree of the super-heated steam for the drying step is 100° C. The dried Adzuki beans thus obtained have a water content of 8%, an appearance evaluation score of 2.8 points, a restoring time of 2 minutes, and a taste evaluation score of 20 points.

EXAMPLE 12

The procedure of Example 1 is carried out, with the exception that the super heat degree of the super-heated steam for the drying step is 150° C., and the drying in this condition is conducted for 10 minutes. The dried Adzuki beans thus obtained have a water content of 8%, an appearance evaluation score of 2.5 points, a restoring time of 1.5 minutes, and a taste evaluation score of 18 points.

Control Example 9

The procedure of Example 1 is carried out, with the exception that the super heat degree of the super-heated steam for the drying step is 200° C., and the drying in this condition is conducted for 8 minutes. The dried Adzuki beans thus obtained have a water content of 8%, an appearance evaluation score of 2 points, a restoring time of 5 minutes, and a taste evaluation score of 10 points.

The results of Examples 10, 11 and 12 and those of Control Examples 8 and 9 are shown in Table 3.

TABLE 3

| | Super heat degree (°C.) | Drying time (min.) | Appearance (points) | Restoring time (min.) | Sense of hardness when eaten (points) | Water content (%) |
|---|---|---|---|---|---|---|
| Control 8 | 30 | 20 | 2 | 7 | 6 | 12 |
| Example 10 | 60 | 15 | 2.8 | 2 | 20 | 8 |
| Example 11 | 100 | 12 | 2.8 | 2 | 20 | 8 |
| Example 12 | 150 | 10 | 2.5 | 1.5 | 18 | 8 |
| Control 9 | 200 | 8 | 2 | 5 | 10 | 8 |

As will be clear from the result shown in Table 3, it has been found that a satisfactory result of drying is obtained from a super heat temperature of 60°–150° C. of the super-heated steam during the drying step.

Control Example 10

The procedure of Example 1 is carried out, excepting that the drying ability of the super-heated steam for the drying step is 0.3, and that the drying step in this condition is conducted for 30 minutes. The dried Adzuki beans thus obtained have a water content of 13%, an appearance evaluation score of 2 points, a restoring time of 8 minutes, and a taste evaluation score of 5 points.

EXAMPLE 13

The procedure of Example 1 is conducted, with the exception that the drying ability of the super-heated steam for the drying step is 0.4, and the drying step in this condition is conducted for 15 minutes. The dried Adzuki beans thus obtained have a water content of 10%, an appearance evaluation score of 2.5 points, a restoring time of 5 minutes, and a taste evaluation score of 16 points.

EXAMPLE 14

The procedure of Example 1 is carried out, with the exception that the drying ability of the super-heated steam for the drying step is 0.5, and the drying step in this condition is performed for 15 minutes. The dried Adzuki beans thus obtained have a water content of 10%, an appearance evaluation score of 2.5 points, a restoring time of 2 minutes, and a taste evaluation score of 18 points.

EXAMPLE 15

The procedure of Example 1 is followed, excepting that the drying ability of the super-heated steam for the drying step is 0.6. The dried Adzuki beans thus obtained have a water content of 8%, an appearance evaluation score of 2.8 points, a restoring time of 1.5 minutes, and a taste evaluation score of 20 points.

EXAMPLE 16

The procedure of Example 1 is carried out, with the exception that the drying ability of the super-heated steam for the drying step is 0.7, and the drying step in this condition is conducted for 11 minutes. The dried Adzuki beans thus obtained have a water content of 8%, an appearance evaluation score of 2.5 points, a restoring time of 1.5 minutes, and a taste evaluation score of 20 points.

EXAMPLE 17

The procedure of Example 1 is carried out, with the exception that the drying ability of the super-heated steam for the drying step is 0.8, and the drying step in this condition is conducted for 10 minutes. The dried Adzuki beans thus obtained have a water content of 8%, an appearance evaluation score of 2.5 points, a restoring time of 2 minutes, and a taste evaluation score of 18 points.

Control Example 11

The procedure of Example 1 is performed, with the exception that the drying ability of the super-heated steam for the drying step is 0.9, and the drying step in this condition is conducted for 9 minutes. The dried Adzuki beans thus obtained have a water content of 7%, an appearance evaluation score of 2 points, a restoring time of 8 minutes, and a taste evaluation score of 5 points.

The results of Examples 13, 14, 15, 16 and 17 and those of Controls 10 and 11 are shown in Table 4.

TABLE 4

| | Drying ability | Drying time (min.) | Appearance (points) | Restoring time (min.) | Sense of hardness when eaten (points) | Water content (%) |
|---|---|---|---|---|---|---|
| Control 10 | 0.3 | 30 | 2 | 8 | 5 | 13 |
| Example 13 | 0.4 | 15 | 2.5 | 3 | 16 | 10 |
| Example 14 | 0.5 | 13 | 2.5 | 2 | 18 | 10 |
| Example 15 | 0.6 | 12 | 2.8 | 1.5 | 20 | 8 |
| Example 16 | 0.7 | 11 | 2.5 | 1.5 | 20 | 8 |
| Example 17 | 0.8 | 10 | 2.5 | 2 | 18 | 8 |
| Control 11 | 0.9 | 9 | 2 | 8 | 5 | 7 |

As will be clear from Table 4, it has been found that a satisfactory result of drying is obtained from super-heated steam having a dryness of 0.4–0.8.

EXAMPLE 18

The procedure of Example 1 is carried out, with the exception that sucrose fatty acid ester is added, in various different amounts, to the liquid of the secondary boiling step. The result is shown in Table 5.

TABLE 5

| | Sucrose fatty acid ester (%) | | | | | |
|---|---|---|---|---|---|---|
| | 0.1 | 0.2 | 0.4 | 0.6 | 0.8 | 1.0 |
| Appearance (points) | 2.8 | 2.8 | 2.9 | 2.9 | 2.9 | 2.9 |
| Restoring time (min.) | 2 | 1.7 | 1.5 | 1.0 | 1.0 | 1.0 |
| Sense when eaten: | | | | | | |
| Granular (points) | 15 | 17 | 19 | 20 | 20 | 20 |
| Hardness (points) | 20 | 20 | 20 | 20 | 20 | 20 |
| Flavor | good | good | good | good | good | foreign taste sensed |

Notes:
Ester content is shown in percent by weight relative to the weight of the liquid of the secondary boiling step.

As will be clear from Table 5, an inclusion of sucrose fatty acid ester in the liquid of the secondary boiling step is found to be effective in improving the restoring time and the sense when eaten such as granular feeling, as compared with Example 1. An appropriate amount of sucrose fatty acid ester added is found to be 0.2–0.8%, preferably 0.4–0.6%.

EXAMPLE 19

The procedure of Example 1 is carried out, with the exception that sorbic fatty acid ester is added, in various different amounts, to the liquid of the secondary boiling step. The result is shown in Table 6.

TABLE 6

| | Sorbic fatty acid ester (%) | | | | | |
|---|---|---|---|---|---|---|
| | 0.1 | 0.2 | 0.4 | 0.6 | 0.8 | 1.0 |
| Appearance (points) | 2.8 | 2.8 | 2.9 | 2.9 | 2.9 | 2.9 |
| Restoring time (min.) | 2 | 1.7 | 1.5 | 1.0 | 1.0 | 1.0 |
| Sense when eaten: | | | | | | |
| Granular (points) | 14 | 16 | 19 | 20 | 20 | 20 |
| Hardness (points) | 20 | 20 | 20 | 20 | 20 | 20 |
| Flavor | good | good | good | good | good | foreign taste sensed |

Notes:
Ester content is shown in percent by weight relative to the weight of the liquid of the secondary boiling step.

As will be clear from Table 6, an inclusion of sorbic fatty acid ester in the liquid of the secondary boiling step is found to be effective in improving the restoring time and the sense when eaten such as granular feeling, as compared with Example 1. An appropriate amount of sorbic fatty acid ester added is found to be 0.2–0.8%, preferably 0.4–0.6%.

EXAMPLE 20

The procedure of Example 1 is carried out, with the exception that glycerin fatty acid ester is added, in various different amounts, to the liquid of the secondary boiling step. The result is shown in Table 7.

TABLE 7

| | Glycerin fatty acid ester % | | | | | |
|---|---|---|---|---|---|---|
| | 0.1 | 0.2 | 0.4 | 0.6 | 0.8 | 1.0 |
| Appearance (points) | 2.8 | 2.9 | 3.0 | 3.0 | 3.0 | 3.0 |
| Restoring time (min.) | 2 | 2 | 1.7 | 1.5 | 1.5 | 1.5 |
| Sense when eaten: | | | | | | |
| Granular (points) | 15 | 15 | 16 | 17 | 17 | 17 |
| Hardness (points) | 20 | 20 | 20 | 20 | 20 | 20 |

TABLE 7-continued

| | Glycerin fatty acid ester % | | | | | |
|---|---|---|---|---|---|---|
| | 0.1 | 0.2 | 0.4 | 0.6 | 0.8 | 1.0 |
| Flavor | good | good | good | good | good | foreign taste sensed |

Notes:
Ester content is shown in percent by weight relative to the weight of the liquid of the secondary boiling step.

As will be clear from Table 7, an inclusion of glycerin fatty acid ester in the liquid of the secondary boiling step is found to be effective in improving the external appearance, the restoring time and the sense when eaten such as granular feeling, as compared with Example 1. An appropriate amount of glycerin fatty acid ester added is found to be 0.2-0.8%, preferably 0.4-0.6%.

What is claimed is:

1. A method for producing processed dried beans which are quickly restored to the condition of boiled soft raw beans by immersion in hot water, said beans being rich in starch and poor in both protein and fat, said method comprising the steps of:
   (1) boiling said raw beans in water at least once;
   (2) enzymatically treating said boiled beans by contacting said boiled beans with an aqueous solution of a cellulose enzyme or a mixture of cellulase and pectinase enzymes for a period of time sufficient to destroy the cellulosic substances or the cellulosic and pectic intercellular substances existing in the cell walls of the beans allowing improved permeation of hot water into the core of each bean so treated;
   (3) boiling said enzyme-treated beans of step (2) in an acidic solution at a pH of about 1.5 to about 5.5 to swell and gelatinize the starch component contained in the bean cells; and thereafter
   (4) drying the beans boiled in step (3) using super-heated steam to produce dried processed beans having a good appearance and substantially free from cracks and fractures.

2. A method according to claim 1, wherein said cellulase is selected from a group consisting of cellulase produced by Trichoderma viride, cellulase produced by Irpex lacteus and cellulase produced by Trichoderma koningi.

3. A method according to claim 1 or 2, wherein said pectinase is selected from a group consisting of pectinase produced by Rhizopus arrhizus and pectinase produced by Conithrium diplodiella.

4. A method according to claim 1, wherein said beans are selected from a group consisting of Adzuki beans, Peyin beans, Kidney beans, Scarlet runners, Lima beans, Peas, Broad beans, Cuba beans, and Catiangs.

5. A method according to claim 1, wherein said enzyme solution of step (2) contains cellulase in an amount of about 0.1 to about 5.0% by weight based on the weight of said beans brought into contact with said enzyme solution.

6. A method according to claim 5, wherein said enzyme solution contains about 0.4 to 1.0% by weight cellulase.

7. A method according to claim 1, wherein said enzyme solution contains cellulase in an amount of about 0.1 to about 3.0% by weight and pectinase in an amount of about 0.1 to about 4.0% by weight relative to the weight of said beans being brought into contact with said enzyme solution.

8. A method according to claim 7 wherein said enzyme solution contains about 0.3 to about 1.0% cellulase and about 0.3 to about 1.0% pectinase.

9. A method according to claim 5 or 7, wherein said enzyme solution has a pH of 3.0 to 7.0.

10. A method according to claim 9, wherein said enzyme solution has a pH of 3.5 to 5.0.

11. A method according to claim 1, wherein said enzymatic treatment in step (2) is carried out at a temperature of about 30° to about 50° C.

12. A method according to claim 11, wherein said temperature is about 40° to about 45° C.

13. A method according to claim 11, wherein said enzymatic treatment in step (2) is carried out with stirring for about 0.5 to about 3 hours.

14. A method according to claim 11, wherein said enzymatic treatment in step (2) is carried out by immersing without stirring said boiled beans obtained from said preliminary boiling step (1) in said enzyme solution for about 0.5 to about 6 hours.

15. A method according to claim 1, wherein said preliminary boiling in step (1) prior to said enzymatic treatment in step (2) is carried out at atmospheric pressure at a temperature in the vicinity of boiling point of water for a total period of from 3 to 30 minutes.

16. A method according to claim 1, further including prior to step (1) immersing said raw beans in water at a temperature of 5° to 60° C. for 2 to 18 hours.

17. A method according to claim 1, wherein said boiling in step (3) is carried out in a solution having a pH of about 3 to about 4.5, at atmospheric pressure, for 20 to 80 minutes.

18. A method according to claim 1, wherein said secondary boiling in step (3) is carried out in a solution having a pH of about 3 to about 4.5, under pressure, at a temperature of 110° to 130° C., for 10 to 40 minutes.

19. A method according to claim 1, wherein said boiling in step (1) is carried out in the presence of sodium polyphosphate or potassium polyphosphate as a softening promoter.

20. A method according to claim 1, further including applying a coating of sucrose or lactose to the beans between steps (3) and (4) by immersing said beans in a sucrose or lactose-containing solution.

21. A method according to claim 1, wherein said drying in step (4) is carried out by super-heated steam having a dryness ability of about 0.4 to about 0.8 and a super-heat degree of about 60° to about 150° C. until the beans have a water content of about 8 to about 12% by weight relative to the weight of the dried beans.

22. A method according to claim 21, wherein said drying requires about 10 to about 20 minutes.

23. A method for producing processed dried beans which are quickly restored to the condition of boiled soft raw beans by immersion in hot water, said beans being rich in starch and poor in both protein and fat, said method comprising the steps of:
   (1) boiling said raw beans in water at least once;
   (2) enzymatically treating said boiled beans by contacting said boiled beans with an aqueous solution of a cellulase enzyme or a mixture of cellulase and pectinase enzymes at a pH of about 3.0 to about 7.0 for a period of time sufficient to destroy the cellulosic substances or the cellulosic and pectic intercellular substances existing in the cell walls of the beans allowing improved permeation of hot water into the core of each bean so treated;

(3) boiling said enzyme-treated beans of step (2) in an acidic solution at a pH of about 1.5 to about 5.5 to swell and gelatinize the starch component contained in the bean cells: and thereafter (4) drying the beans boiled in step (3) using super-heated steam having a super-heat degree of about 60° to about 150° C. and a drying ability of up to about 0.8 until the beans have a water content of about 8 to about 12% by weight relative to the weight of the dried beans, thereby producing dried processed beans having a good appearance and substantially free from cracks and fractures.

24. Processed dried beans suitable for instant cooking, which are quickly restored to the condition of boiled soft raw beans without developing cracks and fractures when immersed in hot water, said beans being rich in starch and poor in both protein and fat, wherein the starch component in said dried beans has been converted to an α-type starch and that cellulosic substances or cellulosic and pectic substances of cell tissues of said beans have been sufficiently destroyed through an enzymatic treatment, and the processed dried beans having good appearance, substantially without cracks and fractures produced by the method of claim 1.

25. Processed dried beans according to claim 24, having a moisture content of about 8 to about 12% by weight relative to the weight of the dried beans.

* * * * *